No. 863,846. PATENTED AUG. 20, 1907.
A. HASSE.
HOSE CART.
APPLICATION FILED AUG. 13, 1906.
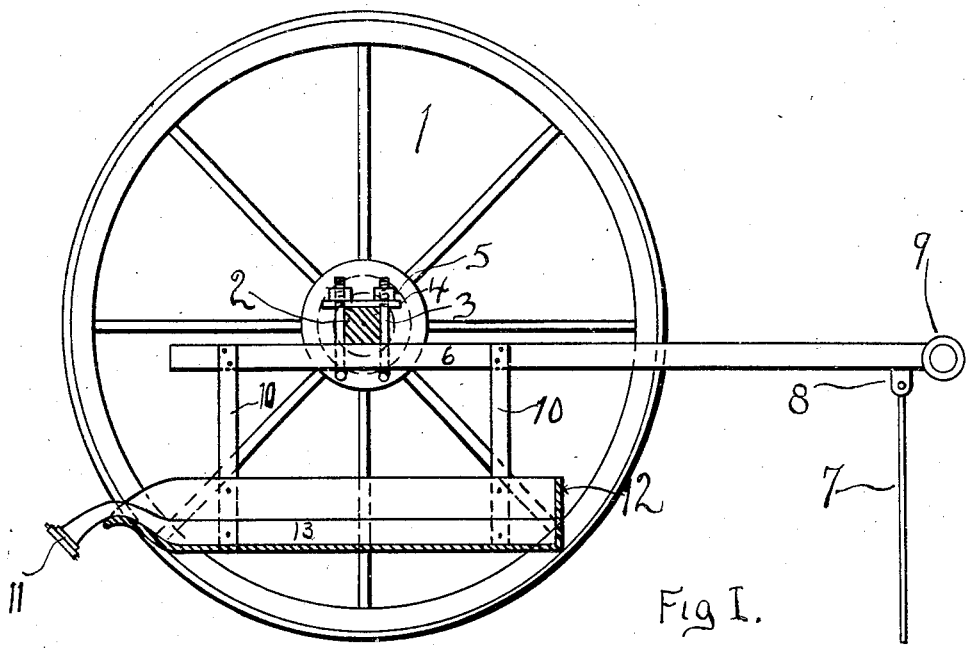
Fig I.
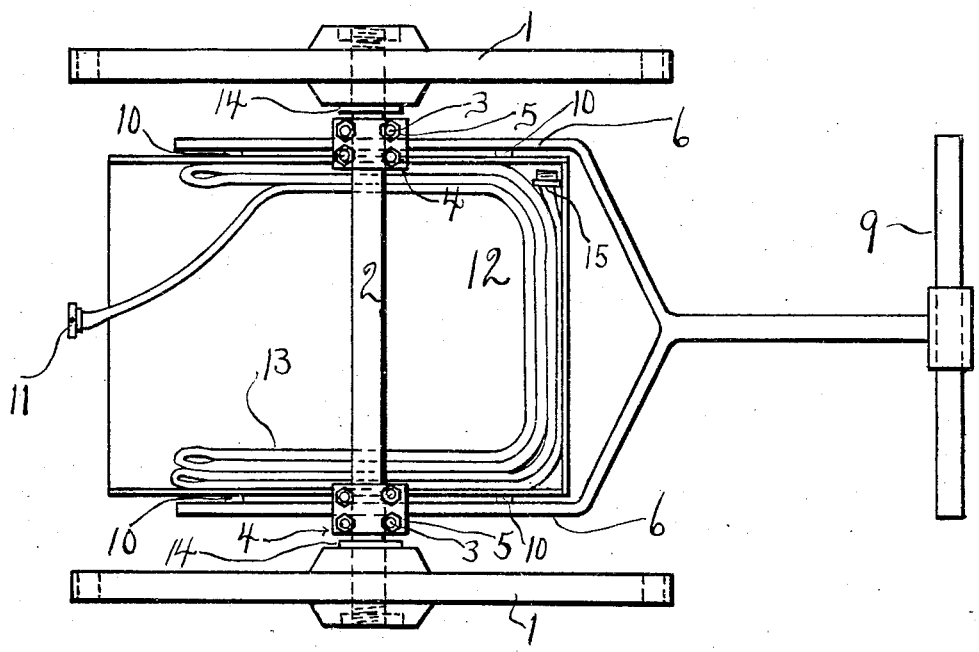
Fig II.
WITNESSES:
Edward B. Birkenbeuel.
Andrew J. Johnson
INVENTOR
Albert Hasse
BY
Andrew H. Neureuther.
ATTORNEY

UNITED STATES PATENT OFFICE.

ALBERT HASSE, OF PERU, ILLINOIS.

HOSE-CART.

No. 863,846.  Specification of Letters Patent.  Patented Aug. 20, 1907.

Application filed August 13, 1906. Serial No. 330,411.

*To all whom it may concern:*

Be it known that I, ALBERT HASSE, a citizen of the United States, residing at Peru, in the county of Lasalle and State of Illinois, have invented a new and useful Improvement in Hose-Carts, of which the following is a specification.

My invention relates to improvements in hose carts such as are generally used by fire departments and more particularly those that are drawn by hand, and has for its object the production of a hose cart which does not have a reel, and which is always balanced, and from which the hose can be readily removed without the danger of damaging the couplings, and which can be very lightly and inexpensively constructed. I attain these objects by the mechanism illustrated in the accompanying drawings, in which;—

Figure 1, represents a sectional view of the hose cart showing my invention. Fig. 2, is a top view of the hose cart.

Similar figures refer to similar parts in all the drawings.

The axle 2 of my cart is journaled in the wheels 1 in the usual manner. Attached to the axle 2 by means of the U-shaped bolts 3 is the forked handle frame 6, the prongs of said forked handle frame 6 passing through the U-shaped bolts 3, which in turn pass through tie-plates 4 immediately above and resting upon the axle 2, said tie-plates being held in place by means of the nuts 5 which are screwed on to the threaded stems of the U-shaped bolts 3. It will be readily seen that by loosening the nuts 5 the forked handle frame 6 can be moved either forward or backward. Fastened to and depending from the prongs of the forked handle frame 6 are four vertical bars 10 whose lower ends are fastened to a pan or receptacle 12 which in my invention is used to carry the hose. One method of placing the hose in the pan is shown in Fig. 2 in which 13 is the body of the hose, while 15 is the male end and 11 is the female end of said hose, which end 15 is placed in the corner of the pan and the hose packed against itself bringing the female end last and which in case of removing the hose is first removed, when the remainder of the hose readily follows, coming off layer after layer just as it was put on.

9 is the handle by means of which the cart is drawn.

8 is a projection on forked handle frame 6 into which the rod 7 is pivotally connected and which serves to keep the handle elevated when cart is not being used.

In hose carts using the reel for the hose, it is a well known fact, that it requires more than one man to draw the cart along at a fair speed and lay off the hose when the end is attached to the hydrant. One man can easily draw my hose cart in laying off the hose. With the reel there is always the danger of ruining the couplings on the hose due to the reel continuing to rotate after the cart is stopped, which will render the hose useless. In my cart this danger is entirely eliminated. It is evident that my cart can be kept in perfect balance by means of the U-shaped bolts 3.

I claim;

In a hand hose cart, a forked handle frame having rigid prongs, means for adjustably fastening said prongs to the axle between the wheels in which said axle is journaled, said means comprising the U-shaped bolts 3, the tie plate 4 and the nuts 5, in combination with a pan suspended from said prongs by means of the bars rigidly fastened to said prongs and said pan, substantially as shown and described.

In testimony whereof I have signed my name to this specification in the presence of two subscribing witnesses.

ALBERT HASSE.

Witnesses:
J. E. SEEPE,
OTTO J. LOEKLE.